United States Patent [19]
Carlson

[11] Patent Number: 4,756,065
[45] Date of Patent: Jul. 12, 1988

[54] PASTER ROLLER

[75] Inventor: James Carlson, Racine, Wis.

[73] Assignee: American Roller Company, Bannockburn, Ill.

[21] Appl. No.: 7,001

[22] Filed: Jan. 27, 1987

[51] Int. Cl.⁴ .............................................. B21B 31/08
[52] U.S. Cl. ................................................... 29/132
[58] Field of Search ........................................ 29/132

[56] References Cited

U.S. PATENT DOCUMENTS

| | | | |
|---|---|---|---|
| 2,230,289 | 2/1941 | Dodge | 18/59 |
| 3,435,500 | 4/1969 | Aser et al. | 29/130 |
| 3,475,803 | 11/1969 | Hill | 29/132 |
| 3,520,747 | 7/1970 | McGaughey | 156/153 |
| 3,662,446 | 5/1972 | Walls | 29/130 |
| 3,686,731 | 8/1972 | Koori et al. | 29/132 |
| 3,780,960 | 12/1973 | Tokuno et al. | 242/58.1 |
| 3,795,033 | 3/1974 | Donnelly et al. | 29/132 |
| 3,858,287 | 1/1975 | Christoffersen | 29/132 |
| 3,988,817 | 11/1976 | Thettu | 29/130 |
| 4,009,841 | 3/1977 | Matalia | 242/58.3 |
| 4,309,803 | 1/1982 | Blaszak | 29/132 X |
| 4,313,981 | 2/1982 | Namiki | 427/409 |
| 4,368,568 | 1/1983 | Watanabe | 29/130 |
| 4,372,246 | 2/1983 | Azar et al. | 29/132 X |

Primary Examiner—Mark Rosenbaum
Assistant Examiner—Frances Chin
Attorney, Agent, or Firm—Quarles & Brady

[57] ABSTRACT

Improved paster rollers for use in splicing paper webs include a rigid core; a compressible intermediate porous layer surrounding said core; and, a coating of silicone elastomer on the walls of the cells of the outer porous surface of said intermediate layer. Methods of preparing the paster rollers also are disclosed.

4 Claims, 2 Drawing Sheets

PASTER ROLLER

FIELD OF THE INVENTION

The present invention generally relates to rollers. More particularly, it relates to a paster roller for use in splicing together paper webs and a method of making the roller.

BACKGROUND OF THE INVENTION

In the printing industry, it is known that significant savings can be achieved if the presses are run continuously. For this reason, equipment has been developed to enable individual rolls of paper web to be spliced together so that the presses do not have to be stopped or if stopped are stopped for only a minimum of time to change rolls of paper.

The web splicing equipment can be automatic, such as that shown in the Tokuno, et al, U.S. Pat. No. 3,780,960, or manual, such as that shown in the Matalia U.S. Pat. No. 4,009,841. However, it usually includes means of gluing the repsective ends of two rolls of paper web together to form a continuous web and one or more paster rollers that hold the respective glued ends of the two rolls together until a suitable bond is formed.

The web splicing equipment generally works very well. However, on occasion a defective splice may result from a web sticking to a paster roller. When this occurs the presses must be stopped if the splice fails or a portion of the press production must be discarded if the splice holds but results in an unacceptable section of web.

There is a need for improved paster rollers that eliminate or reuce the problems of paper webs sticking to paster rollers.

BRIEF DESCRIPTION OF THE INVENTION

It is an object of the present invention to disclose novel, improved paster rollers to which a web being processed is less likely to stick.

It is a further object to disclose methods of preparing such a paster roller.

The novel paster rollers of the present invention consist of a relatively rigid core, an intermediate layer of porous foam, preferably polyurethane, of the desired density, weight and compressibility and a cured silicone elastomer coating on the walls of the cells that form the outer surface of the porous foam. The coating of silicone rubber which preferably is thinner near the core; and becomes progressively thicker as it gets further away from the core not only reduces the tendency of webs to stick to the paster roller, but also surprisingly increases the useful life of the paster roller.

The preferred method of preparing a roller of the present invention comprises applying an adhesive which is non-tacky at ambient temperatures to the outer surface of a rigid, roller core; either foaming in place on the core the intermediate layer of porous foam or placing the core in a close fitting bore formed in a porous foam block of the desired density, weight and compressibility; wrapping the outside of the core and the porous foam with tape to apply pressure to the foam and to bring the exposed surface of the foam into contact with the core; heating the wrapped porous foam and core in an oven at an elevated temperature at which the adhesive becomes tacky and flows into contact with the adjacent porous cells of the porous foam; letting the wrapped porous foam and core combination cool and the adhesive to set; trimming and/or grinding off the tape and any of the porous foam necessary to form a cylindrical roller; applying to porous foam on the external surface of the roller a coating of liquid, uncured vulcanizable silicone elastomer; spinning the roller to drive off the excess silicone elastomer and then permitting the silicone elastomer coating to cure.

The intermediate porous foam layer is preferably of the open cell type, but it can be a closed cell foam. The preferred material of the intermediate layer is polyurethane but it can also be sponge rubber or any other suitable material. Furthermore, in addition to the manner already described the intermediate layer may be formed by wrapping the core with a reinforced sheet of foam with a fabric backing, preferably in a spiral fashion so it becomes tighter with use, or a foam sheet having veins of fabric which radiate outwardly from the core to the outer diameter.

Novel rollers of the present invention have been tested and found to be superior in performance to the most widely used paster rollers which consist of a metal core and a polyurethane foam cover. The rollers also have been found to possess a longer useful life than prior art rollers which is surprising because silicone elastomer is known to be softer and less resistant to abrasion than polyurethane elastomer.

DESCRIPTION OF THE PREFERRED EMBODIMENT

Figure 1:
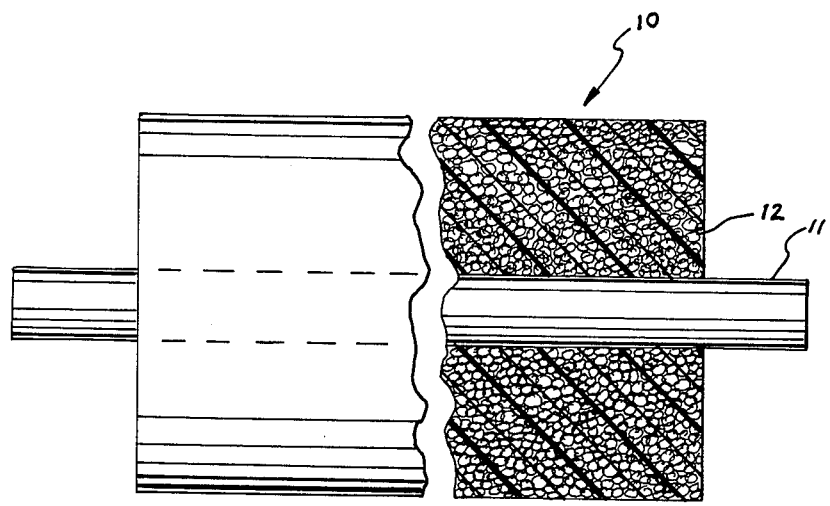
FIG. 1 is a fragmented elevational view, partially in section, showing one embodiment of the roller of the present invention.

Referring to FIG. 1 of the drawing a paster roller 10 is shown having a relatively rigid core or shaft 11, preferably of fiberglass, steel or aluminum, and an intermediate layer of firm porous open cell foam 12, preferably polyurethane foam.

Figure 2:
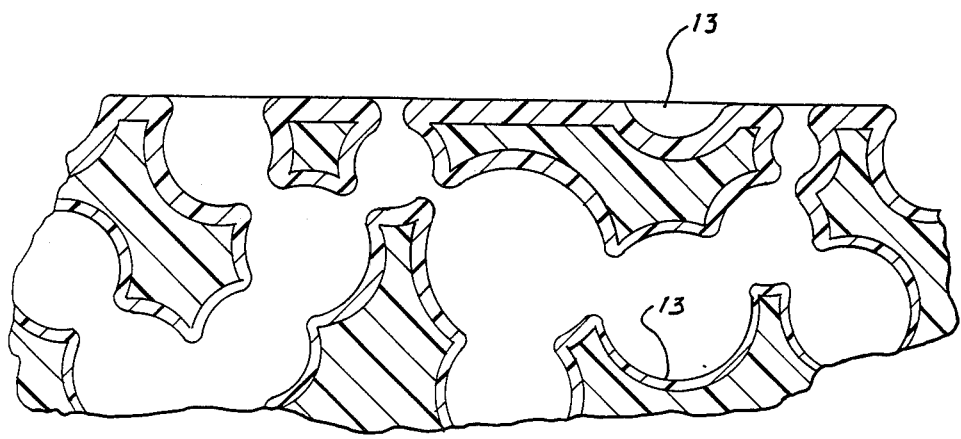
FIG. 2 is a fragmented enlarged view of the porous outer surface of the roller of FIG. 1.

As seen only in FIG. 2, the outermost portion of the intermediate layer of porous foam 12 has a relatively thin coating 13 of silicone elastomer which becomes thicker as it progresses from the inside to the outside surface.

The preferred core or shaft 11 is a tube which ranges from $2\frac{1}{2}$ to $3\frac{1}{2}$ inches in diameter and from 24 to 125 inches long. The porous intermediate layer 12 is preferably of an open cell polyurethane foam and is about 2 to 8 inches thick. It completely surrounds the core 11 and has a foam density of about 2 lbs. to about 12 lbs. per cubic foot and an indental force compression (IFD) of about 80 lbs. to about 100 lbs. per square inch. The thin outer coating 13 of silicone elastomer has an average thickness of about $0.001 \pm 0.005$ inches. As previously stated, the thickness of the coating 13 should gradually increase from the inside to the outside of the porous layer so as to minimize the shearing force exerted on the roller when in use it comes into contact with a rapidly moving web.

Figure 3:
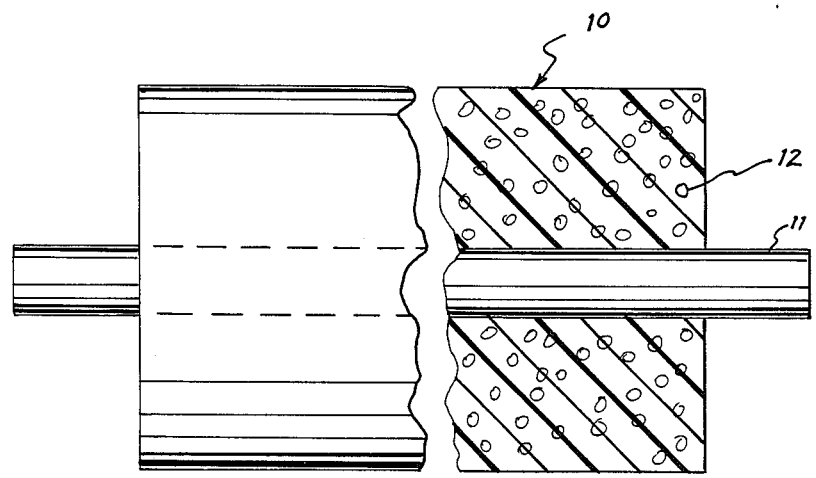
FIG. 3 is a fragmented elevational view, partially in section, showing a second embodiment of the roller of the present invention; and, FIG. 4 is a fragmented enlarged view of the porous outer surface of the roller of FIG. 3.
Figure 4:
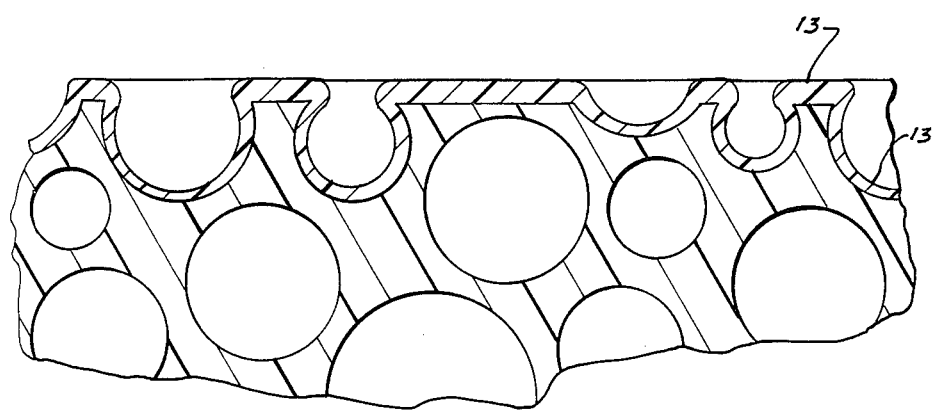

The embodiment of the roller of FIGS. 3 and 4 is identical to that of FIGS. 1 and 2 except that the porous foam 12 is a closed cell foam.

The preferred porous foam may be either a polyester or polyether polyurethane; however, sponge rubber or other suitable materials can be used. Suitable porous foams formulations, blocks and sheets for preparing the roller are available from many commercial sources.

The adhesive for binding the porous foam 12 to the core 11 is one that is easily applied, that is non-tacky at ambient temperatures and which becomes tacky at elevated temperatures (e.g. 100° F. to 150° F.). A suitable adhesive is 3M Brand adhesive EC-1781, which is available from the 3M Company in St. Paul, Minn., U.S.A. It contains synthetic rubber, polyvinyl chloride resin, epoxide, organic acid and stabilizer. It is a thin syrup at room temperature and dries at ambient temperatures to form a non-tacky coat. However, it softens and becomes extremely tacky at 100° F. to 150° F.

A suitable vulcanizable silicone elastomer for preparing the thin outer coating 13 is the room temperature vulcanizable product available from Dow Corning under the trade name Dispersion 236. It is especially preferred because it can be readily poured onto the uncoated roller and the excess can be removed and the desired graded thickness of the layer 13 can be formed by spinning the roller at relatively high speeds (e.g. 500 rpm). Other products suitable for use include heat vulcanizable products, which are commercially available and are described in the "Handbook of Silicone Rubber Fabrication" by Wilfred Lynch, Van Nostrand Reinhold Company 1978 (which is incorporated by reference herein).

The preferred method of preparing the novel roller of the present invention is described in the example which follows:

EXAMPLE I

An aluminum core 2½ inches in diameter and 54 inches long was coated with a thin layer of 3M Adhesive EC-1781 and allowed to dry to a non-tacky state. An 8 inch square block of yellow polyurethane foam (IFD 80 lbs.) 48 inches long was placed in an 8 inch square frame and a central 2½ inch hole is bored lengthwise through the block. The square block was then removed from the frame and the outer periphery trimmed to form a block which has the cross sectional shape of a regular octagon. The adhesive coated core was inserted into the bore and the outer surface of the polyurethane foam block was tightly wrapped with cloth tape. The wrapped block and core were placed in an oven and heated to 125° F. to 150° F. to make the adhesive tacky and to permit it to flow into the foam layer and then cooled at room temperature to permit the adhesive to set. The tape wrapped block and core were then placed in a lathe trimmed, and the tape and outer surface of the foam layer ground off to form a cylindrical roller of the desired diameter with a porous outer surface. The outer surface of the roller was then coated with a room temperature vulcanizing silicone elastomer by pouring the liquid elastomer on the outside of the polyurethane foam as it was slowly rotated (30 to 60 rpm). When the yellow polyurethane foam was completely coated and appeared white the roller was rotated at about 500 rpm for several (2-5) minutes to spin off the excess silicone elastomer. The silicone coating was then allowed to cure to yield the desired roller. The layer of silicone on the outer surface of cells of the the foam was about 0.001±0.0005 inches thick.

The thus prepared roller was superior in use to prior art rollers because the web had less tendency to adhere to it and it had a longer useful life.

In another embodiment, a paster roller also may be prepared by coating the outer surface of the foam layer with sufficient elastomer to fill the pores and form a thin (0.005 to 0.010 inch thick) contiguous outer coating or skin of silicone elastomer. However, this type of roller is less resistant to damage from shearing forces than the preferred roller.

It will be apparent to those skilled in the art that a number of changes and modifications may be made without departing from the scope of the invention. For example, the firmness, weight, density, or resistance to compression of the intermediate layer can be readily tailored to fit a particular use as can the thickness of the outer layer. In addition, of course, other materials than those described can be used to form the intermediate layer provided they yield a roller having the desired properties. Therefore, it is intended that the invention not be limited except by the claims.

I claim:
1. A paster roller consisting of:
   (a) a relatively rigid core;
   (b) an intermediate layer of open celled foam, said foam consisting essentially of an organic polymer; and
   (c) a coating of cured silicone elastomer on the walls of the open cells of the foam, said coating being thinner on the walls of the cells closer to the core and thicker on the walls of the cells further from the core so that the shearing force that might be exerted when it contacts a rapidly moving surface will be minimized.
2. A paster roller of claim 1 in which the organic polymer is polyurethane.
3. A paster roller of claim 1 in which the organic polymer is polyester.
4. A paster roller of claim 1 in which the organic polymer is rubber.

* * * * *